(12) United States Patent
Lee et al.

(10) Patent No.: US 11,377,044 B2
(45) Date of Patent: Jul. 5, 2022

(54) INPUT DEVICE AND VEHICLE INCLUDING THE SAME, AND METHOD OF CONTROLLING INPUT DEVICE

(71) Applicants: Hyundai Motor Company, Seoul (KR); Kia Motors Corporation, Seoul (KR); The Board of Trustees of the Leland Stanford Junior University, Palo Alto, CA (US)

(72) Inventors: Seunghwan Lee, Gyeonggi-do (KR); Sean Follmer, Stanford, CA (US); Inrak Choi, Incheon (KR)

(73) Assignees: Hyundai Motor Company, Seoul (KR); Kia Motors Corporation, Seoul (KR); The Board of Trustees of the Leland Stanford Junior University, Palo Alto, CA (US)

( * ) Notice: Subject to any disclaimer, the term of this patent is extended or adjusted under 35 U.S.C. 154(b) by 0 days.

(21) Appl. No.: 16/991,539

(22) Filed: Aug. 12, 2020

(65) Prior Publication Data
US 2022/0048441 A1 Feb. 17, 2022

(51) Int. Cl.
*B60R 11/02* (2006.01)
*G05G 5/03* (2008.04)
*B60R 11/00* (2006.01)

(52) U.S. Cl.
CPC ............ *B60R 11/0264* (2013.01); *G05G 5/03* (2013.01); *B60R 2011/0007* (2013.01)

(58) Field of Classification Search
CPC .................................................. B60R 11/0264
See application file for complete search history.

(56) References Cited

U.S. PATENT DOCUMENTS

| | | | |
|---|---|---|---|
| 2005/0195167 A1* | 9/2005 | Matsumoto | G06F 3/016 345/161 |
| 2007/0013335 A1* | 1/2007 | Yoshida | G05G 5/03 318/466 |
| 2017/0075476 A1* | 3/2017 | Kwon | G06F 3/04883 |
| 2017/0147106 A1* | 5/2017 | Kwon | G06F 3/04883 |

* cited by examiner

*Primary Examiner* — Vicky A Johnson
(74) *Attorney, Agent, or Firm* — Fox Rothschild LLP

(57) ABSTRACT

An input device provides an improved feeling of operation to a user and allows the user to recognize an operation of a handle by providing haptic feedback by limiting a direction of movement of the handle of the input device provided in a vehicle according to a control item, applying a reaction force to the handle, or generating a vibration. The input device includes the handle that is movable in a first direction and a second direction and a motor that is configured to generate force related to a movement of the handle. A driver is configured to operate the motor. A controller operates the driver to limit a moving direction of the handle to the first direction or the second direction according to a control item controlled by the movement of the handle.

31 Claims, 14 Drawing Sheets

TOP VIEW

SIDE VIEW

INPUT DEVICE AND VEHICLE INCLUDING THE SAME, AND METHOD OF CONTROLLING INPUT DEVICE

TECHNICAL FIELD

The present disclosure relates to an input device that receives a user input by a physical operation, a vehicle including the same, and a method of controlling the input device.

BACKGROUND

In a vehicle, various controls related to vehicle functions, such as door control, window control, air conditioner control, and multimedia control, as well as driving-related controls are capable of being performed, and control commands may be input from a user to perform these controls. As described, since various controls may be performed in the vehicle, the user needs to select a desired control item among various control items, input a detailed control command with respect to the selected control item.

SUMMARY

An aspect of the disclosure provides an input device that provides an improved feeling of operation to a user and at the same time allows the user to more accurately recognize a situation in which a handle is being operated by providing haptic feedback by limiting a direction of movement of the handle of the input device provided in a vehicle according to a control item, applying a reaction force to the handle, or generating a vibration, a vehicle including the same, and a method of controlling the input device. Additional aspects of the disclosure will be set forth in part in the description which follows and, in part, will be obvious from the description, or may be learned by practice of the disclosure.

In accordance with an aspect of the disclosure, an input device may include a handle configured to be movable in a first direction and a second direction; a motor configured to generate force related to a movement of the handle; a driver configured to operate the motor; and a controller configured to operate the driver to limit a moving direction of the handle to the first direction or the second direction based on a control item controlled by the movement of the handle.

The input device may further include a first detector configured to detect a user's touch on the handle. The controller may be configured to activate the input device when the user's touch on the handle is detected. The motor may include a first servo motor configured to provide force for restraining the movement of the handle in the first direction; and a second servo motor configured to provide force for restraining the movement of the handle in the second direction.

When the control item matches the movement in the first direction, the controller may be configured to operate the driver to enable the movement of the handle in the first direction and restrain the movement of the handle in the second direction. When the control item matches the movement in the second direction, the controller may be configured to operate the driver to enable the movement of the handle in the second direction and restrain the movement of the handle in the first direction. The controller may be configured to receive information regarding the control item from a vehicle.

The input may further include a first rail configured to guide the movement of the handle in the first direction; and a second rail configured to guide the movement of the handle in the second direction. The handle may be configured to move in the first direction along the first rail and move in the second direction along the second rail. The controller may be configured to match and store a haptic pattern for each control item, and to operate the driver to output a haptic feedback to the handle based on the haptic pattern matched to the input control item when information regarding the control item is input from the outside.

The haptic pattern may be defined by at least one of the moving direction of the handle, the number of graphical user interfaces displayed on a display, and an intensity of the haptic feedback. The controller may be configured to operate the driver to generate a force applied in a direction opposite to a direction in which the handle moves by the user, to output the haptic feedback to the handle.

The graphical user interface displayed on the display may include a first graphical user interface and a second graphical user interface displayed adjacent to each other. When the handle moves from a position corresponding to the first graphical user interface to a position corresponding to the second graphical user interface, the controller may be configured to operate the driver to increase a magnitude of the force applied in the direction opposite to the direction in which the handle moves. When the handle moves to a position corresponding to the second graphical user interface, the controller may be configured to operate the driver to decrease the magnitude of the force applied in the opposite direction of the moving direction.

The input device may further include a second detector configured to detect a force applied to the handle in a third direction; and a vibration generator configured to generate vibration and provide the vibration to the handle. The controller may be configured to operate the vibration generator to generate the vibration when the force applied to the handle in the third direction is detected.

In accordance with an aspect of the disclosure, a vehicle may include an input device having a handle configured to be movable in a first direction and a second direction, a motor configured to generate force related to a movement of the handle, a driver configured to operate the motor, and a controller configured to operate the driver to limit a moving direction of the handle to the first direction or the second direction according to a control item controlled by the movement of the handle; a controller configured to transmit information regarding the control item to the input device; and a display configured to display a plurality of graphical user interfaces respectively corresponding to a plurality of sub-control items for the control item.

The controller of the input device may be configured to match and store a haptic pattern for each control item, and to operate the driver to output a haptic feedback to the handle according to the haptic pattern matched to the input control item when information regarding the control item is input from the controller of the vehicle. The haptic pattern may be configured to be defined by at least one of the moving direction of the handle, the number of graphical user interfaces displayed on a display, and an intensity of the haptic feedback.

The controller of the input device may be configured to operate the driver to generate a force applied in a direction opposite to a direction in which the handle moves by the user, to output the haptic feedback to the handle. The graphical user interface displayed on the display may include a first graphical user interface and a second graphical user interface displayed adjacent to each other. When the handle moves from a position corresponding to the first graphical user interface to a position corresponding to the second graphical user interface, the controller of the input device may be configured to operate the driver to increase a magnitude of the force applied in the direction opposite to the direction in which the handle moves.

When the handle moves to a position corresponding to the second graphical user interface, the controller of the input device may be configured to operate the driver to decrease the magnitude of the force applied in the opposite direction of the moving direction. The display may be configured to highlight and display a graphic user interface corresponding to the position of the handle.

In accordance with an aspect of the disclosure, a method of controlling an input device, the input device including a handle movable in a first direction and a second direction, a motor configured to generate force involved in a movement of the handle, a driver configured to drive the motor, the method may include receiving a control item selected by the user; when the control item matches the movement in the first direction, limiting the movement of the handle to the first direction; and when the control item matches the movement in the second direction, limiting the movement of the handle to the second direction.

The method may further include detecting a user's touch on the handle; and activating the input device when the user's touch on the handle is detected. The method may further include operating the driver to output a haptic feedback to the handle according to a haptic pattern matched to the received control item. The operating of the driver may include operating the driver to generate a force applied in a direction opposite to a direction in which the handle moves by the user to output the haptic feedback to the handle.

The operating of the driver may include adjusting a magnitude of the force applied in the opposite direction to the direction in which the handle moves according to the position of the handle. Additionally, the method may include detecting a force applied in a third direction perpendicular to the first direction and the second direction; and generating a vibration in the handle when the force applied in the third direction is detected.

BRIEF DESCRIPTION OF THE DRAWINGS

These and/or other aspects of the disclosure will become apparent and more readily appreciated from the following description of the exemplary embodiments, taken in conjunction with the accompanying drawings of which:

FIG. 1 is a view illustrating a part of an internal configuration of a vehicle according to an exemplary embodiment.

DETAILED DESCRIPTION

Figure 1:
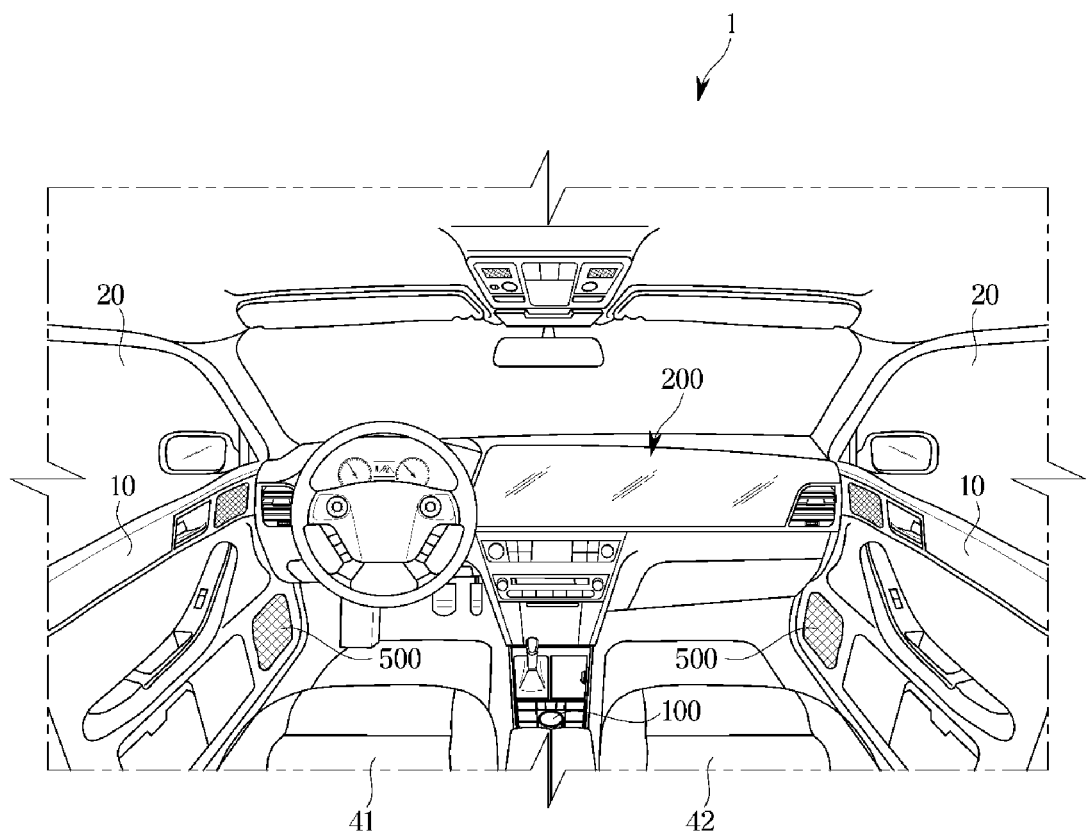
FIG. 1 is a control block diagram of a vehicle according to an exemplary embodiment.

The following description is merely exemplary in nature and is not intended to limit the present disclosure, application, or uses. It should be understood that throughout the drawings, corresponding reference numerals indicate like or corresponding parts and features. Configurations and drawings described herein are examples of the disclosure, and there may be various modifications that can replace the exemplary forms and drawings of the present disclosure at the time of filing of the present application.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Also, the terminology used herein is for the purpose of describing particular forms only and is not intended to be limiting of the disclosure. Singular expressions include plural expressions unless the context clearly indicates otherwise. In addition, terms such as "~part", "~group", "~block", "~member", "~module" may refer to a unit for processing at least one function or operation. For example, the terms may refer to at least one hardware processed by at least one piece of hardware such as a field-programmable gate array (FPGA)/application specific integrated circuit (ASIC), at least one software stored in a memory, or a processor. The references attached to the steps are used to identify the steps. These references do not indicate the order between the steps. Each step is performed in a different order than the stated order unless the context clearly indicates a specific order.

The disclosed exemplary embodiments may be implemented in the form of a recording medium storing computer-executable instructions that are executable by a processor. The instructions may be stored in the form of a program code, and when executed by a processor, the instructions may generate a program module to perform operations of the disclosed embodiments. The recording medium may be implemented non-transitory as a non-transitory computer-readable recording medium.

The non-transitory computer-readable recording medium may include all types of recording media storing commands that can be interpreted by a computer. For example, the non-transitory computer-readable recording medium may be, for example, a read only memory (ROM), a random access memory (RAM), a magnetic tape, a magnetic disc, flash memory, an optical data storage device, etc.

Hereinafter, an input device, a vehicle including the same, and a method of controlling the input device according to an aspect will be described in detail with reference to the accompanying drawings. The input device according to an exemplary embodiment may be configured to receive a user input by a physical operation of a user, and for example, may be used to receive the user input related to control of a vehicle. Hereinafter, for a detailed description, when the input device according to the exemplary embodiment is mounted within the vehicle and used to receive the user input related to control of the vehicle will be described as an example.

FIG. 1 is a control block diagram of a vehicle according to an exemplary embodiment. Referring to FIG. 1, an input device 100 may be provided inside a vehicle 1 to receive a user input through a physical operation or manipulation of a user. For example, the input device 100 may be provided in a center fascia between a driver seat 41 and a passenger seat 42, and a driver in the driver's seat 41 or a passenger in the passenger's seat 42 may input a command for operating the vehicle 1 by physically operating or manipulating the input device 100.

In the exemplary embodiments described below, it is assumed that all passengers who have boarded or entered the vehicle 1 without distinction between the driver and the passenger may be users of the vehicle 1 and the input device 100. However, the number or position of the input device 100 illustrated in FIG. 1 is merely an example applicable to the exemplary embodiment of the vehicle 1 or the input device 100. More than one input device 100 may be provided, or it may also be possible that the input device 100 is mounted at a position other than the center fascia. In particular, it may also be possible that the input device 100 is mounted in a position accessible by the passengers in rear seats in addition to the driver or passengers in the front seats 41 and 42.

Additionally, control items capable of being controlled by the user by operating the input device 100 may include two or more control items of up/down of a window 20, lock/unlock of a door 10, up/down of a volume output through a speaker 500, adjustment of a position or posture of seats 41 and 42, selection of a multimedia content displayed on a display 200, lighting control, navigation control, autonomous driving control, sunroof control, air conditioning control, and other vehicle-related settings. However, the listed control items are merely examples applicable to exemplary embodiments of the vehicle 1 and the input device 100, and it is needless to say that other control items may be included in addition to the listed examples.

Figure 2:
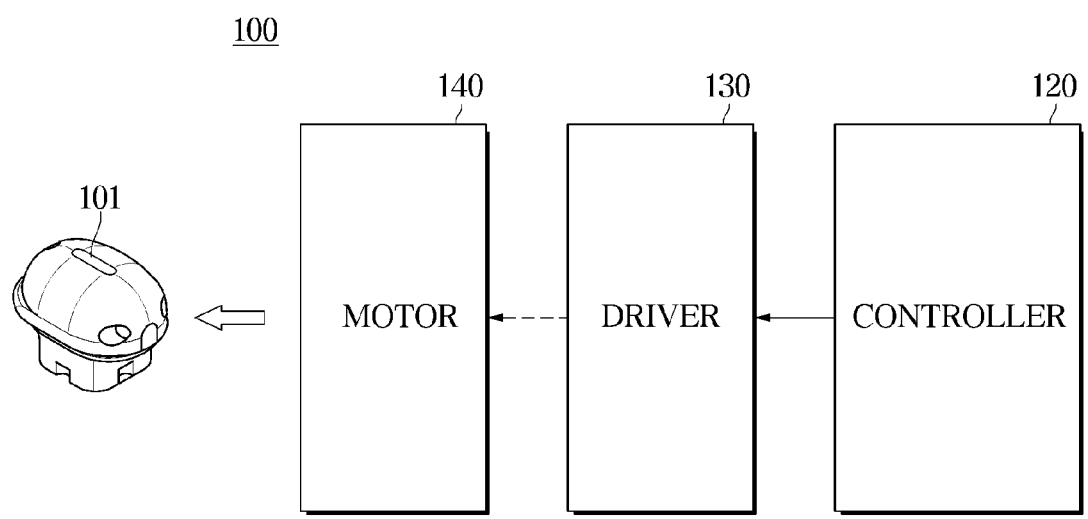
FIG. 2 is a control block diagram of an input device according to an exemplary embodiment.
Figure 3:
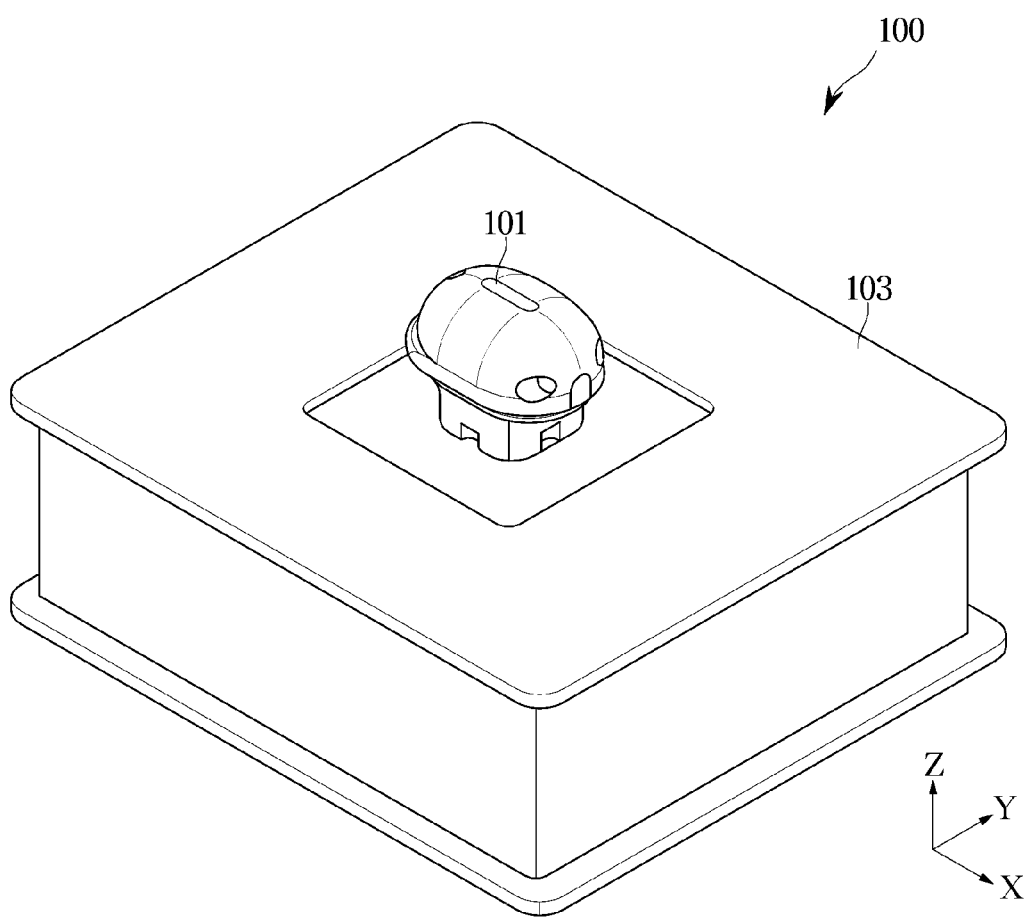
FIG. 3 is a view illustrating an example of an appearance of an input device according to an exemplary embodiment.
Figure 4:
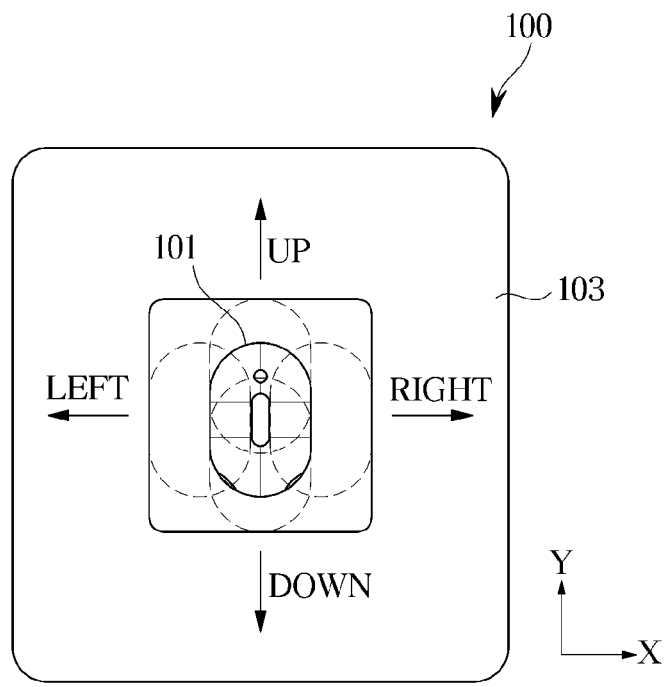
FIG. 4 is a view illustrating a moving direction of an input device according to an exemplary embodiment.
Figure 4:
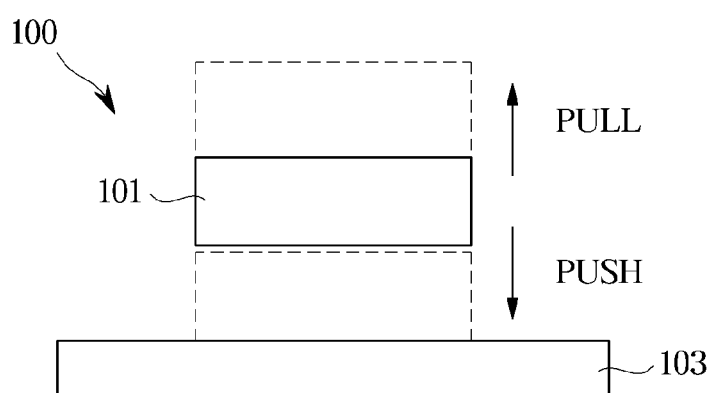

FIG. 2 is a control block diagram of an input device according to an exemplary embodiment, FIG. 3 is a view illustrating an example of an appearance of an input device according to an exemplary embodiment, and FIG. 4 is a view illustrating a moving direction of an input device according to an exemplary embodiment. Referring to FIGS. 2 and 3 together, the input device 100 may include a handle 101 that is movable in a first direction and a second direction, and a motor 140 configured to provide force related to a movement of the handle 101, a driver 130 configured to operate the motor 140, and a controller 120 configured to operate the driver 130 to limit the moving direction of the handle 101 to the first direction or the second direction according to a control item controlled by the movement of the handle 101.

The user's physical operation or manipulation of the input device 100 may be accomplished by moving the handle 101. Therefore, the handle 101 may be provided in a shape that the user is able to grip, and the user may move the handle 101 while gripping the handle 101 and applying a force in a predetermined direction. Structures necessary to move the motor 140, the driver 130, the controller 120, and other handles 101 may be embedded in the housing 103.

Referring to FIG. 4, the handle 101 may be movable in the first direction and the second direction. The first direction may refer to an X-axis direction (horizontal direction), and the second direction may refer to a Y-axis direction (vertical direction). Therefore, the first direction and the second direction are perpendicular to each other on a horizontal plane.

In addition, the handle 101 may also provide a Z-axis operation. In the exemplary embodiment described later, the Z-axis direction will be referred to as a third direction. The user may operate the handle 101 in a +Z direction away from the housing 103 by pulling the handle 101, and in a −Z direction closer to the housing 103 by pushing the handle 101. The moving direction of the handle 101 may be matched for each control item for the vehicle 1. Therefore, the user may input a control command by moving the handle 101 in the first direction or the second direction according to the control item to be controlled by the user.

Figure 5:
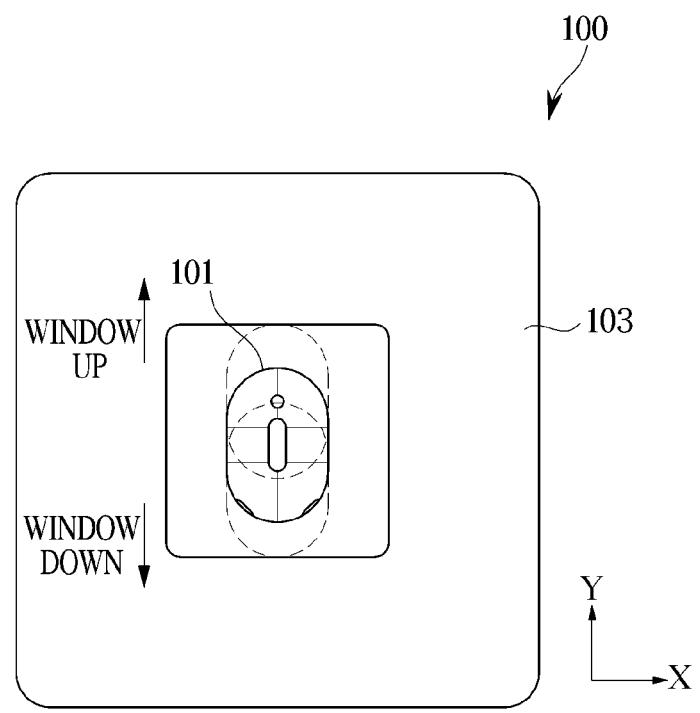
FIGS. 5 and 6 are views illustrating an example of a moving direction of a handle according to a control item in an input device according to an exemplary embodiment.
Figure 6:
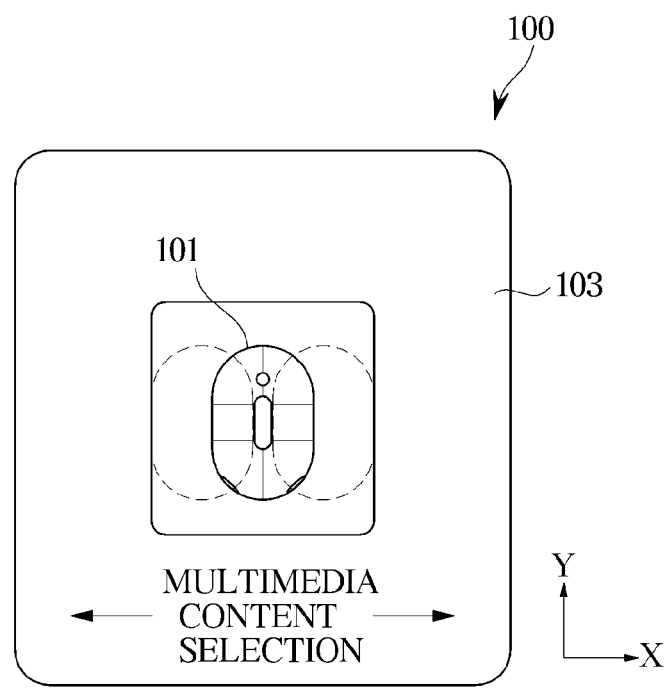

FIGS. 5 and 6 are views illustrating an example of a moving direction of a handle according to a control item in an input device according to an exemplary embodiment. The user may input a sub-control item that is a specific control content for the control item by applying a force to the input device 100 and moving the force. Each of the plurality of control items may have at least one sub-control item.

For example, when the control item is the door control, the sub-control item may include a door lock and a door unlock, and when the control item is the window control, the sub-control item may include a window up and a window down. When the control item is the media control, a selection for each of a plurality of multi-media contents may be included in the sub-control item. In addition, when the control item is the driving control, the sub-control item may include speed up and speed down, or may include changing a driving direction (left and right). When the control item is the air conditioning control, the sub-control item may include temperature increase and temperature decrease, air volume (e.g., air conditioning fan speed) up and air volume down, or wind direction change.

In addition, when the control item is a volume control, the sub-control item may include volume up and volume down, and each volume level indicating a size of the volume may correspond to the sub-control item. Further, when the control item is the sunroof control, the sub-control item may include sunroof open and sunroof close. When the control item is the lighting control, the sub-control item may include lighting on and lighting off, or may include lighting brightness adjustment. When the control item is a seat control, the sub-control item may include adjusting the position or angle of the seats. In addition to the above-described examples, the sub-control items for various control items may be applied to exemplary embodiments of the input device 100 and the vehicle 1.

Referring to an example of FIG. 5, when the control item is the window control, the user may input a window up command by moving the handle 101 of the input device 100 in an upward direction (+Y direction), and may input a window down command by moving the handle 101 of the input device 100 in a downward direction (−Y direction). Alternatively, when the control item is the media control, the user may select the desired multimedia content by moving the handle 101 of the input device 100 in the second direction (left-right direction, X-axis direction) as illustrated in FIG. 6.

The input device 100 may limit the moving direction of the handle 101 according to the control item to guide the user's operation for selecting the sub-control item. For example, when the control item matches the movement in the first direction, the controller 120 may be configured to limit the moving direction of the handle 101 to the first direction. The limitation of the moving direction of the handle 101 to the first direction indicates that the handle 101 is movable in the first direction and the handle 101 is restricted in the second direction (e.g., movement in the second direction is blocked).

In addition, when the control item matches the movement in the second direction, the controller 120 may be configured to limit the moving direction of the handle 101 to the second direction. The limitation of the moving direction of the handle 101 to the second direction indicates that the handle 101 is movable in the second direction and the handle 101 is restricted in the first direction (e.g., movement in the first direction is blocked). On the other hand, even if the moving direction of the handle 101 is limited to the first direction or the second direction, a movement in the third direction may be possible. As described above, by limiting the moving direction of the handle 101 according to the control item to guide the user's operation, it may be possible to improve the accuracy of the input control command.

Information regarding the control item to be controlled by the current user may be input from the vehicle 1, and the controller 120 may be configured to limit the moving direction of the handle 101 based on the information input from the vehicle 1. Accordingly, the vehicle 1 may match and store the moving direction of the handle 101 for each control item. For example, when the sub-control items for the control item have an equal relationship, the moving direction of the input device 100 may be limited to the first direction (horizontal direction) and may be restricted in the second direction (vertical direction). As another example, when the sub-control items for the control item have an up/down relationship, the moving direction of the handle 101 may be matched in the second direction (vertical direction), and the moving direction of the input device 100 may be limited to the second direction (vertical direction) and may be restricted in the first direction (horizontal direction).

Figure 7:
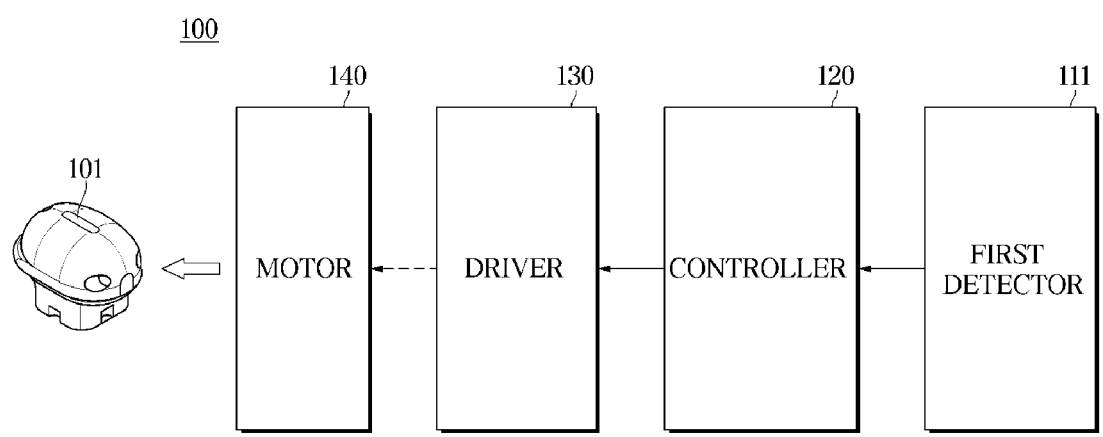
FIG. 7 is a control block diagram of a case in which an input device further includes a configuration of detecting a user's touch according to an exemplary embodiment.

FIG. 7 is a control block diagram of a case in which an input device may further include a configuration of detecting a user's touch according to an exemplary embodiment. Referring to FIG. 7, the input device 100 may further include a first detector 111 configured to detect the user's touch (e.g., configured to detect a user input). For example, the first detector 111 may be implemented as a touch sensor, and may be mounted on the handle 101 to detect a touch between the user and the handle 101.

An output of the first detector 111 may be input to the controller 120. The controller 120 may be configured to activate the input device 100 in response to detecting the user's touch with the handle 101 (e.g., detecting the user manipulation or input to the handle). Activating the input device 100 may indicate that the control command of the user input to the input device 100, that is, the user input received by the input device 100 may be transmitted to the vehicle 1 to switch to a state that may be used perform operation of the vehicle 1.

The input device 100 may be configured to transmit the user input received by the input device 100 to the vehicle 1 only when the user's touch is detected, thereby preventing the vehicle 1 from being controlled by the operation not intended by the user. Alternatively, the activating the input device 100 may indicate that the handle 101 is switched to a movable state. In particular, when the input device 100 is deactivated, the handle 101 is blocking from moving in any of the first direction, the second direction, and the third direction. When the input device 100 is activated, the handle 101 may be movable (e.g., a movable state). As a result, it may be possible to prevent the operation of the input device 100, which is not intended by the user.

When the handle 101 is switched to the movable state, the moving direction may be limited according to the control item as described above. Accordingly, the controller 120 may be configured to transmit a signal indicating that the user's touch is detected to the vehicle 1 in response to detecting the user's touch, and in response to this, the vehicle 1 may be configured to transmit the information related to the control item currently controllable by the user to the controller 120 to the input device 100. A signal transmission between the vehicle 1 and the input device 100 may be performed via an in-vehicle communication protocol such as controller area network (CAN), local interconnect network (LIN), and FlexRay.

Figure 8:
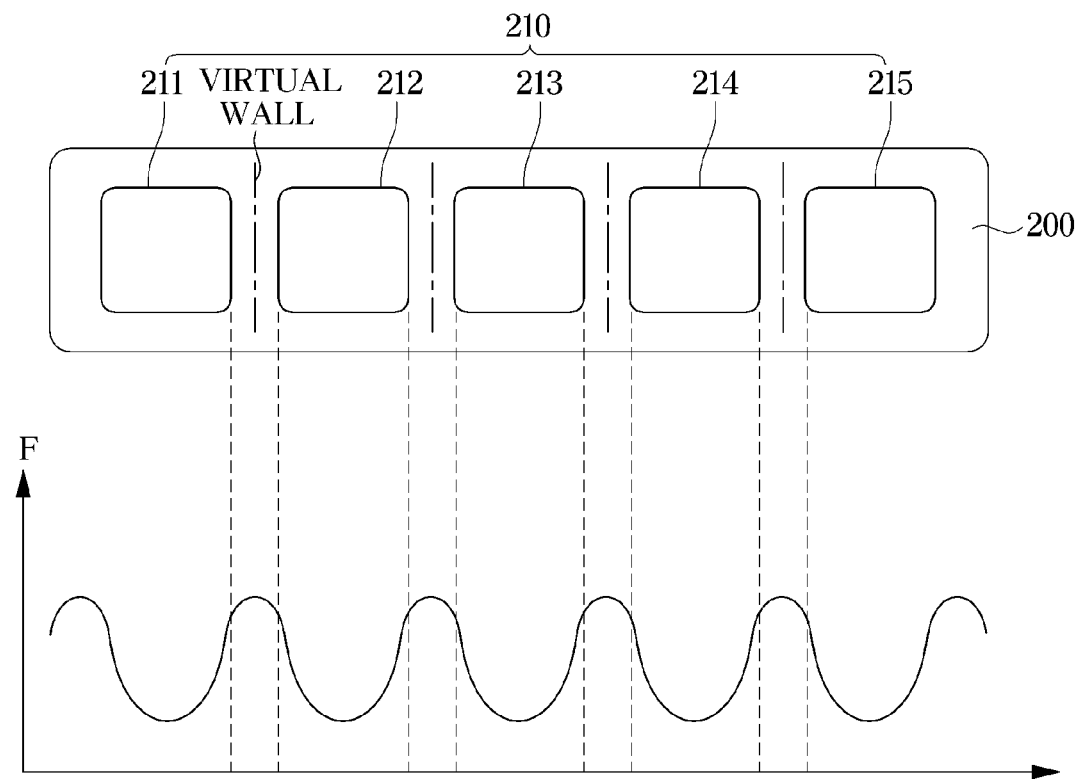
FIGS. 8 and 9 are views illustrating examples of haptic feedback provided to a user when the user moves a handle to select a sub-control item according to an exemplary embodiment.
Figure 8:
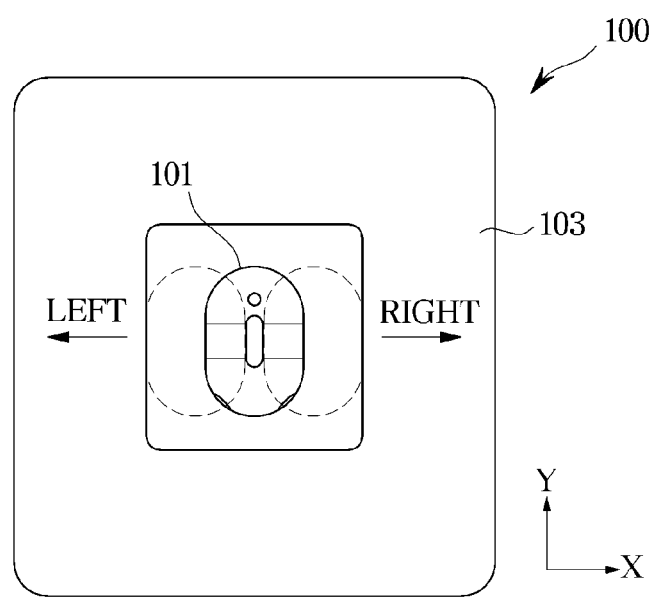
Figure 9:
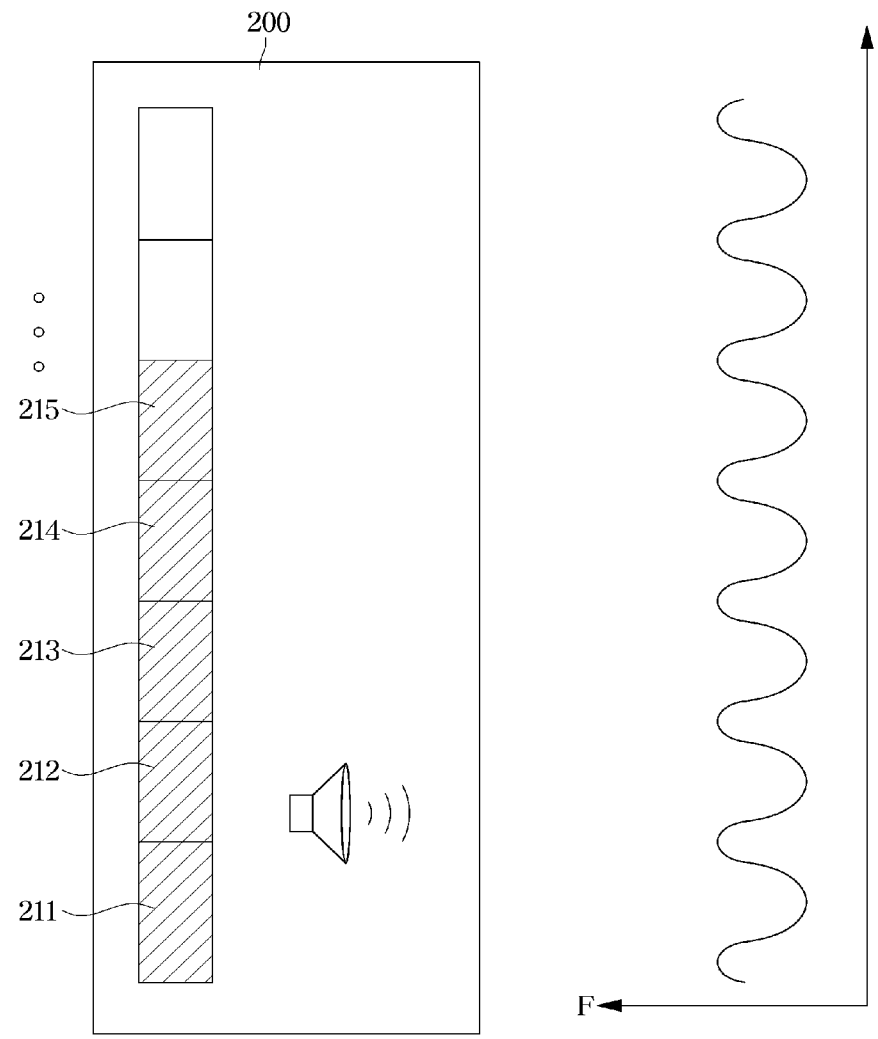
Figure 9:
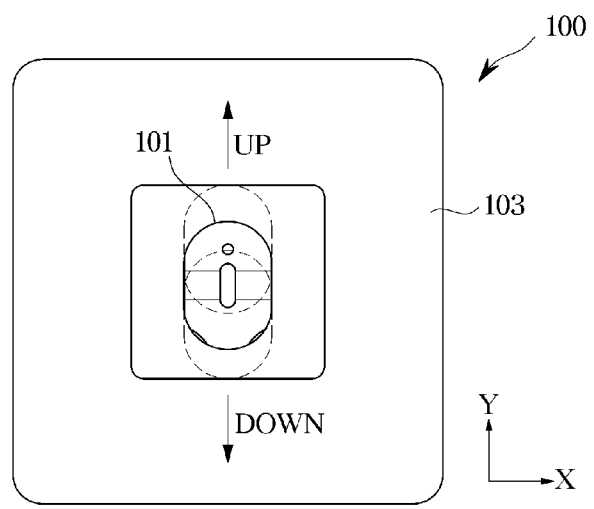

FIGS. 8 and 9 are views illustrating examples of haptic feedback provided to a user when the user moves a handle to select a sub-control item. The controller 120 may be configured to match and store a haptic pattern for each control item. When the information regarding the control item is input from the vehicle 1, the controller 120 may be configured to operate the driver 130 to output haptic feedback to the handle 101 based on the haptic pattern matched with the input control item. For example, the haptic pattern may be defined by at least one of the moving direction of the handle 101, the number of selectable sub-control items (or the number of graphical user interfaces corresponding to the selectable sub-control items), a moving distance of the handle 101 corresponding to a single graphical user interface, and a strength of the force applied to the handle 101.

Referring to FIGS. 8 and 9, a plurality of graphic user interfaces 210 corresponding to the plurality of sub-control items may be displayed on the display 200 mounted in the vehicle 1. The user may select one of the plurality of graphic user interfaces 210 (211, 212, 213, 214, and 215) by operating the input device 100, and the selection of the graphic user interface may refer to selection of the sub-control item corresponding to the corresponding graphic user interface. Therefore, when the graphical user interface is selected, the sub-control item corresponding to the selected graphical user interface may be executed.

When the relationship between the plurality of sub-control items is an equivalent relationship, as illustrated in FIG. 8, the plurality of graphic user interfaces 210 may be arranged in left and right directions. For example, when the control item is a selection of multimedia contents, each of the plurality of graphic user interfaces 210 may represent each of multimedia contents such as selectable videos or music. The user may select one of the plurality of graphic user interfaces 210 by moving the handle 101 in the first direction (left and right directions). At this time, the controller 120 of the input device 100 may be configured to operate the driver 130 to limit the moving direction of the handle 101 to the first direction.

In addition, when the relationship between the plurality of sub-control items is a vertical relationship, the plurality of graphic user interfaces 210 may be arranged in the vertical direction, as illustrated in FIG. 9. For example, when the control item is volume adjustment, each of the plurality of graphic user interfaces 210 may represent each of the selectable volume levels. The user may select one of the plurality of graphic user interfaces 210 by moving the handle 101 in the second direction (e.g., up and down direction). At this time, the controller 120 of the input device 100 may be configured to operate the driver 130 to limit the moving direction of the handle 101 to the second direction.

The controller 120 may be configured to output the haptic feedback to the handle 101 to provide the user moving the handle 101 with information regarding what the graphical user interface is selectable at the current position of the handle 101. The controller 120 may be configured to operate the driver 130 to generate the force applied in a direction opposite to the direction in which the handle 101 moves by the user, to output the haptic feedback to the handle 101.

In the example of FIG. 8, when the user applies the force in the right direction to move the handle 101 in the right direction, the controller 120 may be configured to operate the driver 130 to apply the force in the left or right direction according to the position of the handle 101 to provide accurate control. In the example of FIG. 9, when the user applies the force in the upward direction to move the handle 101 upward, the controller 120 may be configured to operate the driver 130 to apply the force in the downward or upward (e.g., vertically) direction based on the position of the handle 101 to provide accurate control.

When applying the force in the specific direction to the handle 101, the controller 120 may be configured to adjust a step motion to be set as many as a preset number. In the exemplary embodiment, the step motion may refer to adjusting the strength of the haptic feedback differently according to the position of the handle 101. For example, as illustrated in the examples of FIGS. 8 and 9, when the first graphic user interface 211 and the second graphic user interface 212 are displayed adjacent to each other on the display 200, when the handle 101 moves from the position corresponding to the first graphic user interface 211 toward the position corresponding to the second graphic user interface 212, a magnitude of the force applied in an opposite direction to the direction in which the handle 101 moves may be increased.

In addition, when the handle 101 moves to the position corresponding to the second graphic user interface 212, the controller 120 may be configured to increase the force in the direction in which the handle 101 moves, thereby making it possible to select more accurately by feeling the distinction of each step. When the handle 101 is moved to the position corresponding to the second graphic user interface 212, the second graphic user interface 212 displayed on the display 200 may be indicated as the graphic user interface corresponding to the current position of the handle 101 in a manner such as emphasis. Accordingly, the controller 120 may be configured to transmit the information regarding the current position of the handle 101 to the vehicle 1.

The haptic feedback described above may have the same effect as having a virtual wall between adjacent graphical user interfaces. By increasing the force applied in the opposite direction to the moving direction of the handle 101 as the handle approaches the virtual wall, the user may receive the haptic feedback such as crossing the wall, and the haptic feedback such as clicking when crossing the virtual wall.

In addition, after crossing the virtual wall, the strength of the force applied to the handle 101 may be reduced to allow the handle 101 move more easily to the position that corresponds to a center of the second graphic user interface 212. In this way, when the user moves the handle 101, the user may receive feedback as if passing through a virtual groove arrangement corresponding to the graphic user interface 210. More particularly, when the handle 101 moves within the position corresponding to the first graphic user interface 211, as the handle 101 moves away from the position corresponding to the center of the first graphic user interface 211, the magnitude of the force applied in the opposite direction to the direction in which the handle 101 moves may be increased.

As the position of the handle 101 approaches the center (e.g., virtual wall) between the first graphical user interface 211 and the second graphical user interface 212, the magnitude of the force applied in the opposite direction may gradually increase. When the position of the handle 101 passes the position corresponding to the virtual wall between the graphical user interface 211 and the second graphical user interface 212, the force may be applied in the moving direction instead of the force applied in the opposite direction to the direction in which the handle 101 moves to be dragged to the center of the second graphical user interface 212.

The magnitude of the force applied in the direction opposite to the direction in which the handle 101 moves may continue to decrease, and then increase again after the handle 101 passes the position corresponding to the center of the second graphical user interface 212. The above-described process may be repeated whenever the graphic user interface corresponding to the current position of the handle 101 changes. For example, as illustrated in FIG. 8, when there are five graphic user interfaces 210, it may be assumed that there are four virtual walls, and the above-described operation may be repeated four times.

As described above, the example of FIG. 8 is applicable when selecting the multimedia content, and the example of FIG. 9 is applicable when adjusting the volume of sound output through the speaker 500. In addition, when the control item is autonomous driving control, the haptic feedback may be provided to the user through the handle 101 when the left and right lanes are moved, the driving speed is adjusted, the P (Parking)/R (Reverse)/N (Neutral)/D (Drive) is selected, or the driving propensity is selected.

For example, the graphic user interface indicating the current position of the vehicle 1, the graphic user interface indicating a road, and the graphic user interface indicating a lane may be displayed on the display 200, respectively. When the user moves the handle 101 to change lanes, the force may be applied in the direction opposite to the direction in which the handle 101 moves.

At this time, as the position of the vehicle moves closer to the position corresponding to the graphical user interface indicating the lane, the magnitude of the force applied in the opposite direction may be increased. When the graphical user interface corresponding to the lane is crossed, the magnitude of the force applied in the opposite direction may be decreased. At this time, the magnitude of the increasing/decreasing force and a virtual wall inclination may be set differently according to elements or functions in a screen. For the driving control, it may be set differently by the controller 120 in real time to reflect a surrounding driving situation or a safe degree of operation.

When the handle 101 is in the position corresponding to the desired graphical user interface, the user may press the handle 101 to input a selection completion command. When the selection completion command is input, the input device 100 may be configured to transmit a selection completion signal to the vehicle 1. For example, the selection completion signal may include information regarding the current position or a movement amount of the handle 101, and the vehicle 1 may be configured to execute the sub-control item corresponding to the current position or movement amount of the handle 101.

Figure 10:
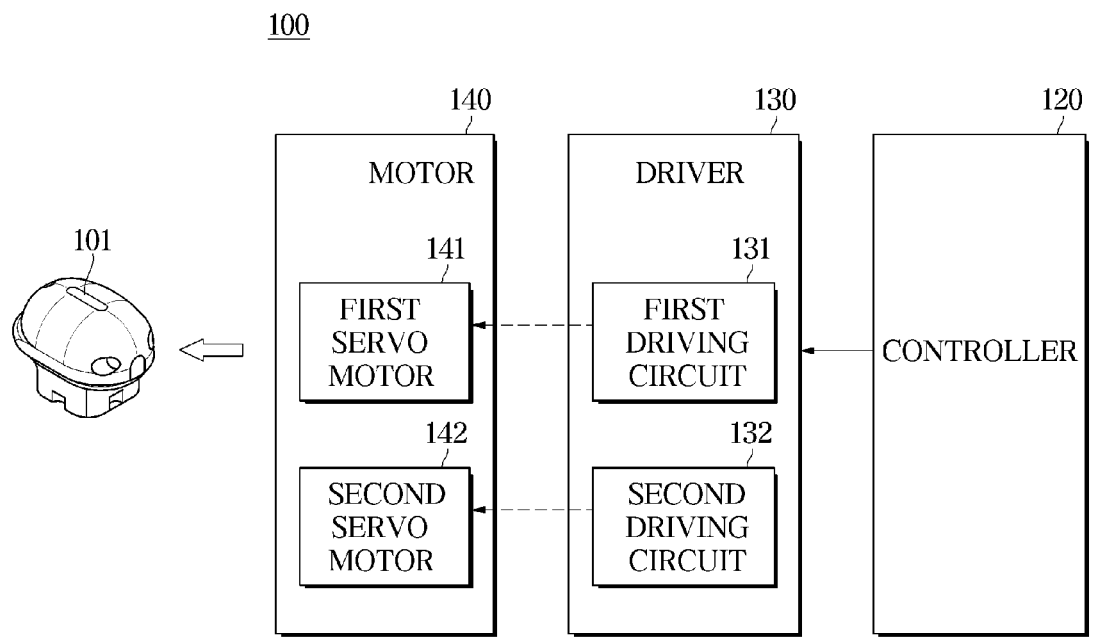
FIG. 10 is a control block diagram embodying a configuration related to a movement of a handle in an input device according to an exemplary embodiment.
Figure 11:
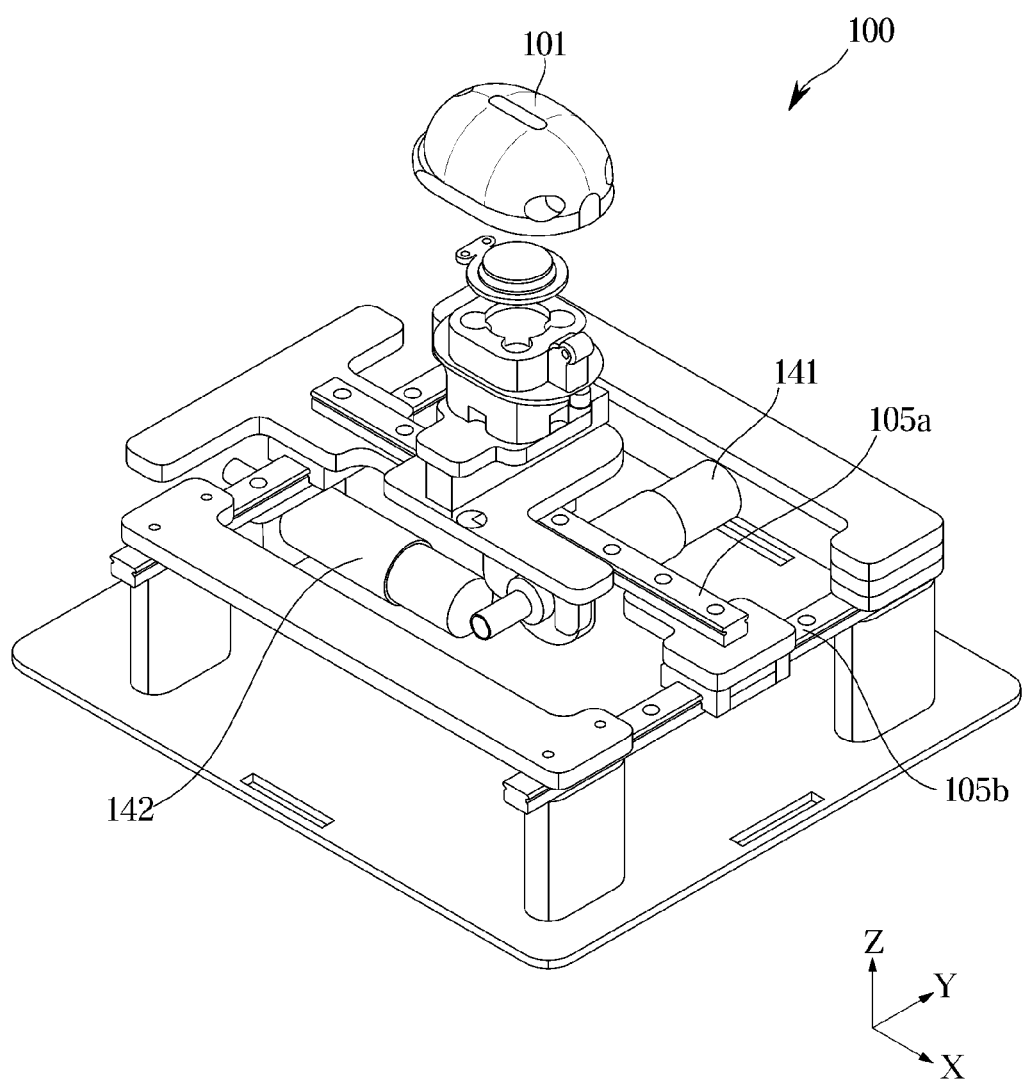
FIG. 11 is a view illustrating an internal configuration of an input device according to an exemplary embodiment.

FIG. 10 is a control block diagram embodying a configuration related to a movement of a handle in an input device according to an exemplary embodiment, and FIG. 11 is a view illustrating an internal configuration of an input device according to an exemplary embodiment. Referring to FIG. 10, the motor 140 of the input device 100 may include a first servo motor 141 configured to provide force for restraining movement of the handle 101 in the first direction and a second servo motor 142 configured to provide force for restraining movement of the handle 101 in the second direction.

Additionally, the driver 130 may include a first driving circuit 131 configured to operate the first servo motor 141 and a second driving circuit 132 configured to operate the second servo motor 142. The controller 120 may be configured to transmit a control signal to the first driving circuit 131 to operate the first servo motor 141, and transmit the control signal to the second driving circuit 132 to operate the second servo motor 142. In addition, referring to FIG. 11, the input device 100 may include a first rail 105a for guiding the movement of the handle 101 in the first direction and a second rail 105b for guiding the movement of the handle 101 in the second direction.

The controller 120 may be configured to transmit the control signal for restraining movement in the second direction to the driver 130 in response to determining that the control item input from the outside matches the movement in the first direction. The driver 130 may be configured to operate the second servo motor 142 to prevent the handle 101 from moving in the second direction along the second rail 105b. In particular, the handle 101 may be freely movable in the first direction along the first rail 105a. In addition, while the handle 101 moves in the first direction along the first rail 105a, as described with reference to FIG. 8 above, the force applied in the opposite direction to the direction in which the handle 101 moves may be generated in the first servo motor 141.

The controller 120 may be configured to transmit the control signal for restraining movement in the first direction to the driver 130 in response to determining that the control item input from the outside matches the movement in the second direction. The driver 130 may be configured to operate the first servo motor 141 to prevent the handle 101 from moving in the first direction along the first rail 105a. In particular, the handle 101 may be freely movable in the second direction along the second rail 105b. In addition, while the handle 101 moves in the second direction along the second rail 105b, as described with reference to FIG. 9 above, the force applied in the opposite direction to the direction in which the handle 101 moves may be generated in the second servo motor 142.

Figure 12:
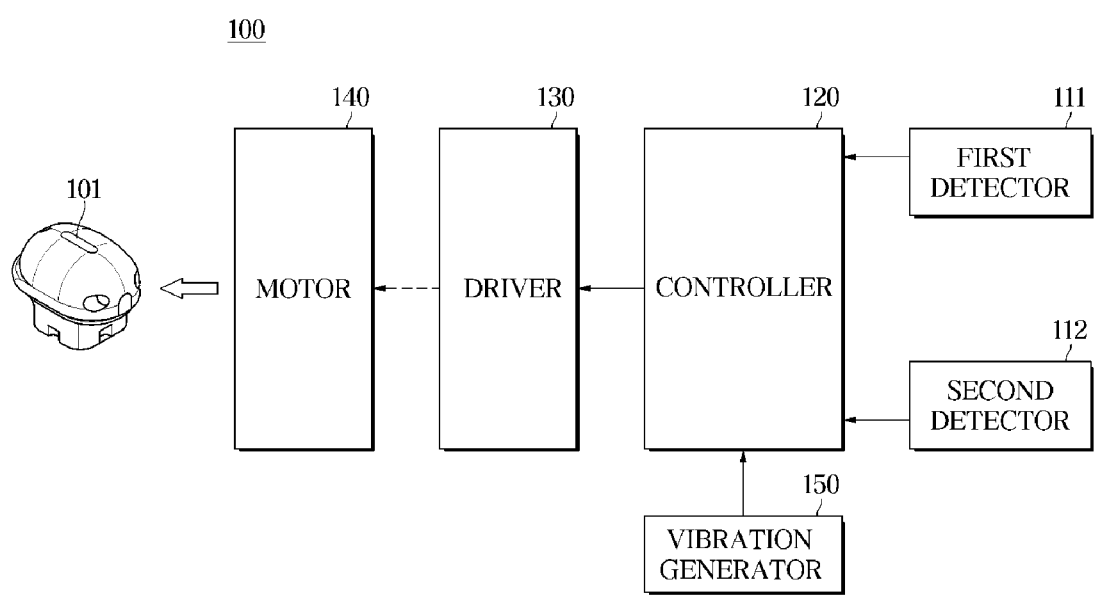
FIG. 12 is a control block diagram for a case in which an input device further includes a second detector according to an exemplary embodiment.

FIG. 12 is a control block diagram for a case in which an input device further includes a second detector according to an exemplary embodiment. The input device 100 may further include a second detector 112 configured to detect the force applied in the third direction to the handle 101 and a vibration generator 150 configured to generate a vibration and provide the vibration to the handle 101.

As described above, when the user pulls the handle 101 (Pull), the handle 101 may move in the +Z direction, and when the user pushes the handle 101 (Push), the handle 101 may move in the −Z direction. The operation of pulling the handle 101 may match the selection cancel or return to the previous step, or the operation of pushing the handle 101 may match the selection completion.

In the examples of FIGS. 8 and 9 described above, when the handle 101 is located at the position corresponding to the desired graphical user interface, the user may push the handle 101 to complete the selection. The second detector 112 may be configured to detect the force applied to the handle 101, and the controller 120 may be configured to transmit the selection completion signal to the vehicle 1. The vehicle 1 receiving the selection completion signal may be configured to execute the sub-control item that corresponds to the selected graphic user interface.

The second detector 112 may be implemented as a force sensor, and may be disposed under the handle 101 to detect the force applied to the handle 101 in the third direction. The second detector 112, which is implemented as the force sensor, may be configured to detect both tensile and compressive forces, and detect both a pulling force and a pressing force of the handle 101 and transmit the result to the controller 120.

When the second detector 112 detects the force applied to the handle 101 in the third direction, the controller 120 may be configured to operate the vibration generator 150 to generate the vibration. For example, the vibration generator 150 may include a voice coil actuator. When the controller 120 transmits the control signal for generating the vibration to the voice coil actuator, the vibration may be generated while a current flows through a coil of the voice coil actuator. The generated vibration may be transmitted to the user through the handle 101. When the user pushes or pulls the handle 101, the vibration transmitted through the handle 101 may provide feedback similar to the feeling obtained when a button is pushed or the pushed button is pulled out.

Figure 13:
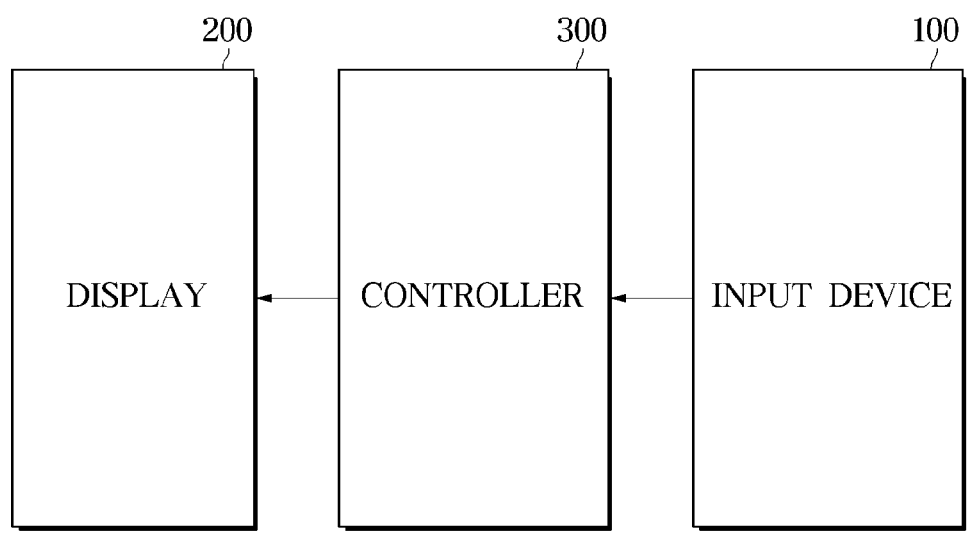
FIG. 13 is a control block diagram of a vehicle according to an exemplary embodiment.

FIG. 13 is a control block diagram of a vehicle according to an exemplary embodiment. Referring to FIG. 13, the vehicle 1 may include the input device 100 according to the above-described exemplary embodiment, the display 200 configured to display the graphic user interface corresponding to the control item or the sub-control item, and a controller 300 configured to transmit the information regarding the control item to the input device 100.

The vehicle 1 may be configured to receive the selection of the control item from the user, and the controller 300 may be configured to transmit the information regarding the selected control item to the input device 100. The input device 100 may be configured to operate the driver 130 to limit the moving direction of the handle 101 to the first direction or the second direction according to the control item transmitted from the controller 300 of the vehicle 1.

The vehicle 1 may be configured to receive the selection of the control item through the user's speech or the user's gaze. When receiving the selection of the control item through the user's speech, the vehicle 1 may include a microphone and a speech recognizer. The speech recognizer may be configured to convert the user's speech into text and transmit the text to the controller 300, and the controller 300 may be configured to determine the control item corresponding to a command included in the user's speech in the text.

When the selection for the control item is input through the user's gaze, an eye tracker that tracks the user's gaze may be included in the vehicle 1. The eye tracker may include a camera configured to obtain the user's eye image and a microprocessor detect an eye by applying an image processing algorithm to the obtained eye image and determine a direction in which the recognized eye is facing, that is, the gaze. In response to the eye tracker determining the gaze of the user (e.g., the gaze direction) and transmitting the result to the controller 300, the controller 300 may be configured to determine the control item corresponding to the user's gaze.

Alternatively, it may be possible to display the plurality of graphic user interfaces corresponding to the plurality of control items on the display 200 and determine the control item corresponding to the graphic user interface selected by the user by operating the input device 100 as the control item selected by the user. The controller 300 may be configured to transmit the information regarding the selected control item to the input device 100. As described above, data transmission between the controller 300 of the vehicle 1 and the input device 100 may be performed via the in-vehicle communication protocol such as CAN, LIN, and FlexRay.

When the information regarding the control item is transmitted, the input device 100 may be configured to limit the moving direction of the handle 101 to the first direction or the second direction based on the transmitted control item. The user input received by the input device 100 may be transmitted to the controller 300 of the vehicle 1, and the controller 300 may be configured to operate the vehicle 1 according to the transmitted user input.

For example, when the plurality of graphical user interfaces 210 corresponding to the plurality of sub-control items are displayed on the display 200, and the user operates the input device 100 to select one of the plurality of graphical user interfaces 210, the input device 100 may be configured to transmit the information regarding the selected graphic user interface 210 or the sub-control item corresponding to the selected graphic user interface 210 to the controller 300 of the vehicle 1. The controller 300 of the vehicle 1 may be configured to perform control corresponding to the corresponding sub-control item.

The information transmitted from the input device 100 to the vehicle 1 may be information regarding the current position or the movement amount of the handle 101 as described above. The controller 300 of the vehicle 1 may be configured to determine the sub-control item selected by the user based on the information regarding the current position or the movement amount of the handle 101. Additionally, the controller 300 may be configured to change the graphic user interface 210 displayed on the display 200 based on the current position of the handle 101.

The input device 100 may be configured to transmit the information regarding the output of the first detector 111 or the second detector 112 to the controller 300 of the vehicle 1. When the output of the first detector 111 indicates the touch with the user's handle 101, the controller 300 may be configured to transmit the information regarding the control item that is a current control target to the input device 100. In addition, operations described as being performed by the vehicle 1 in the above-described exemplary embodiment may be performed by the controller 300 of the vehicle 1.

Hereinafter, a method of controlling the input device 100 according to the exemplary embodiment will be described. In implementing the control method of the input device 100 according to the exemplary embodiment, the above-described input device 100 may be used. Therefore, the contents described with reference to FIGS. 1 to 13 may be applied to the control method of the input device 100 according to the exemplary embodiment even if there is no specific mention. The method described herein below may be executed by the controller.

Figure 14:
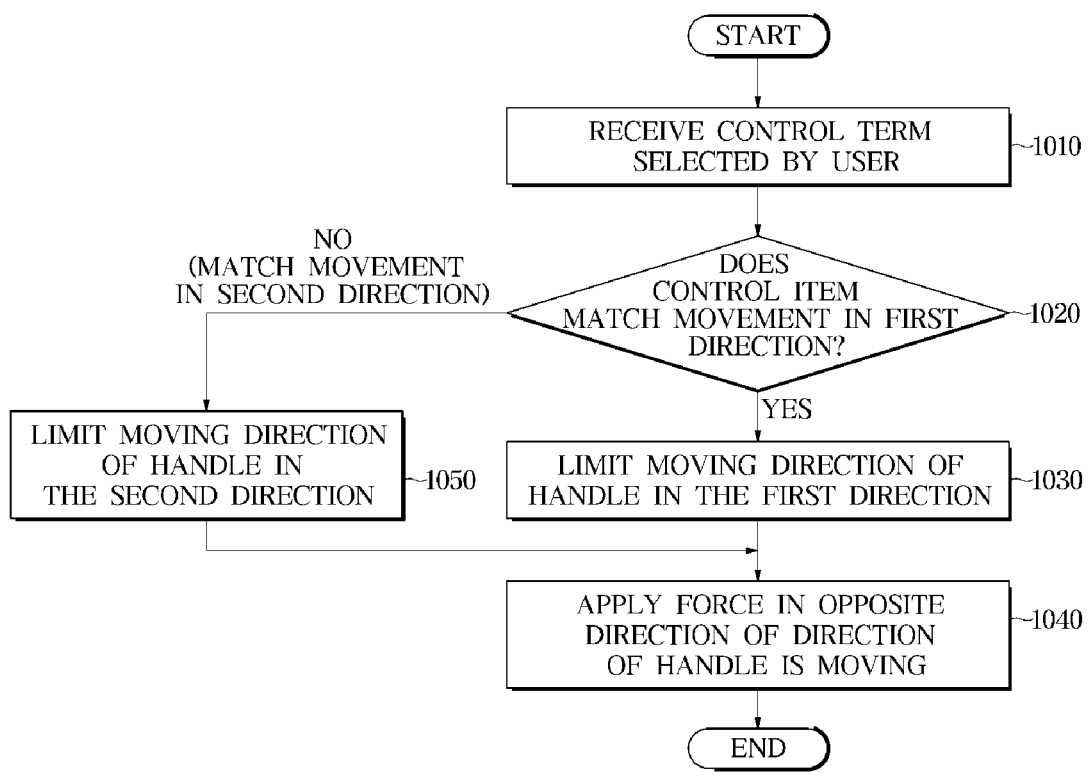
FIG. 14 is a flowchart illustrating a method of controlling an input device according to an exemplary embodiment.

FIG. 14 is a flowchart illustrating a method of controlling an input device according to an exemplary embodiment. The input device 100 may be configured to receive the user input, and the user input received by the input device 100 may include the user's control command for controlling a specific target (e.g. vehicle control), and the user's control command may include selection of the control item, selection of the sub-control item for the control item, and the like. For example, the object controlled by the user through the input device 100 may be the vehicle 1.

When the user selects the control item through speech, gaze, or physical operation of the input device 100, the input device 100 may be configured to receive the control term selected by the user (1010). After the control item is selected, the sub-control item for the control item may be selected, and when the sub-control item is selected, the selected sub-control item may be executed. The input device 100 may be configured to limit the moving direction of the handle 101 according to the control item to guide the user's operation for selecting the sub-control item. For example, the handle 101 may be movable in the above-described first direction (e.g., up and down directions) or second direction (e.g., left and right directions). The moving direction of each control item may be matched and stored in advance.

In response to determining that the selected control item matches the movement in the first direction (YES in 1020), the moving direction of the handle 101 may be limited to the first direction. The limiting of the moving direction of the handle 101 to the first direction indicates that the handle 101 is movable in the first direction and the movement is restricted in the second direction. In response to determining that the selected control item matches the movement in the second direction (NO in 1020), the moving direction of the handle 10 may be limited to the second direction (1050). The limiting of the moving direction of the handle 101 to the second direction indicates that the handle 101 is movable in the second direction and the movement is restricted in the first direction.

When the control item matches the movement in the first direction, the user may move the handle 101 by applying the force in the first direction to the handle 101 to select the sub-control item. To guide the user's operation, the graphic user interface 210 corresponding to the sub-control item may be displayed on the display 200 as illustrated in FIG. 9. When the control item matches the movement in the second direction, the user may move the handle 101 by applying the force in the second direction to the handle 101 to select the sub-control item. To guide the user's operation, the graphic user interface 210 corresponding to the sub-control item may be displayed on the display 200 as illustrated in FIG. 8.

When the user moves the handle 101 in the first direction or in the second direction, the controller 120 may be configured to output the haptic feedback to the handle 101 to provide the user with the information regarding what the graphic user interface is selectable at the current position of the handle 101. To output the haptic feedback to the handle 101, the controller 120 may be configured to apply the force in the direction opposite to the direction in which the handle 101 moves by the user (1040).

When applying the force in the specific direction to the handle 101, the controller 120 may be configured to adjust the step motion to be set as many as a preset number. For example, when the first graphic user interface 211 and the second graphic user interface 212 are displayed adjacent to each other, as illustrated in the examples of FIGS. 8 and 9, when the handle 101 moves from the position corresponding to the first graphic user interface 211 toward the position corresponding to the second graphic user interface 212, the magnitude of the force applied in the opposite direction to the direction in which the handle 101 moves may be increased. In addition, when the handle 101 moves to the position corresponding to the second graphic user interface 212, the controller 120 may be configured to decrease the magnitude of the force applied in the opposite direction to the direction in which the handle 101 moves.

When the user pushes the handle 101 to complete the selection of the graphical user interface, the input device 100 may be configured to transmit the selection completion signal to the vehicle 1. The vehicle 1 receiving the selection completion signal may be configured to execute the sub-control item corresponding to the selected graphic user interface. In addition, when the user pushes the handle 101 to complete the selection or pulls the handle 101 to cancel the selection or return to the previous step, the second detector 112 may be configured to detect the movement, and the controller 120 may be configured to operate the vibration generator 150 to generate vibration in the handle 101 to provide the haptic feedback to the user.

According to the exemplary embodiment described so far, by controlling the moving direction of the handle 101 according to the control item to guide the user's operation, accurate user input may be ensured. In addition, in moving the handle in the specific direction to select the sub-control item, by applying the force in the opposite direction to the direction in which the handle moves, the magnitude of the applied force is adjusted differently according to the position of the handle 101, it may be possible to provide the user with the information regarding the currently selectable sub-control item and to provide intuitive haptic feedback associated with the selection of the sub-control item.

According to the exemplary embodiments of the disclosure, the input device, the vehicle including the same, and the method of controlling the input device may provide an improved feeling of operation to the user and at the same time allow the user to accurately recognize a situation in which the handle is being operated by providing haptic feedback in a manner such as limiting the direction of movement of the handle according to a control item, applying a reaction force to the handle, or generating vibration.

Exemplary embodiments of the disclosure have thus far been described with reference to the accompanying drawings. It should be obvious to a person of ordinary skill in the art that the disclosure may be practiced in other forms than the exemplary embodiments as described above without changing the technical idea or essential features of the disclosure. The above exemplary embodiments are only by way of example, and should not be interpreted in a limited sense.

What is claimed is:

1. An input device, comprising:
 a handle configured to be movable in a first direction and a second direction;
 a motor configured to generate force related to a movement of the handle;
 a driver configured to operate the motor;
 a first detector configured to detect a touch on the handle; and
 a controller configured to receive information regarding a control item among a plurality of control items controlled by a vehicle and to operate the driver to limit a moving direction of the handle to the first direction or the second direction based on the received information,
 wherein the controller is configured to activate the input device in response to detecting the touch on the handle,
 wherein the handle is configured to receive a selection of one of a plurality of sub-control items for the control item regarding the received information,
 wherein the controller is configured to transmit a signal related to the selection of one of a plurality of sub-control items, based on the movement of the handle along the first direction or the second direction.

2. The input device according to claim 1, wherein the motor includes:
 a first servo motor configured to provide force for restraining the movement of the handle in the first direction; and
 a second servo motor configured to provide force for restraining the movement of the handle in the second direction.

3. The input device according to claim 1, wherein, in response to determining that the control item matches the movement in the first direction, the controller is configured to operate the driver to enable the movement of the handle in the first direction and restrain the movement of the handle in the second direction.

4. The input device according to claim 1, wherein, in response to determining that the control item matches the movement in the second direction, the controller is configured to operate the driver to enable the movement of the handle in the second direction and restrain the movement of the handle in the first direction.

5. The input device according to claim 1, wherein the controller is configured to receive information regarding the control item in a graphical user interface of a vehicle.

6. The input device according to claim 1, further comprising:
 a first rail configured to guide the movement of the handle in the first direction; and
 a second rail configured to guide the movement of the handle in the second direction, wherein the handle is configured to move in the first direction along the first rail and move in the second direction along the second rail.

7. The input device according to claim 1, wherein the controller is configured to match and store a haptic pattern for each control item, and to operate the driver to output a haptic feedback to the handle according to the haptic pattern matched to the input control item in response to receiving information regarding the control item from the outside.

8. The input device according to claim 7, wherein the haptic pattern is defined by at least one of the moving direction of the handle, the number of the control items in graphical user interfaces displayed on a display, and an intensity of the haptic feedback.

9. The input device according to claim 8, wherein the controller is configured to operate the driver to generate a force applied in a direction opposite to a direction in which the handle moves by the user to output the haptic feedback to the handle.

10. The input device according to claim 9, wherein the graphical user interface displayed on the display includes a first graphical user interface and a second graphical user interface displayed adjacent to each other.

11. The input device according to claim 10, wherein, in response to the handle being moved from a position corresponding to the first graphical user interface to a position corresponding to the second graphical user interface, the controller is configured to operate the driver to increase a magnitude of the force applied in the direction opposite to the direction in which the handle moves.

12. The input device according to claim 11, wherein, in response to the handle being moved to a position corresponding to the second graphical user interface, the controller is configured to operate the driver to decrease the magnitude of the force applied in the opposite direction of the moving direction.

13. The input device according to claim 1, further comprising:
a second detector configured to detect a force applied to the handle in a third direction; and
a vibration generator configured to generate vibration and provide the vibration to the handle.

14. The input device according to claim 13, wherein the controller is configured to operate the vibration generator to generate the vibration in response to detecting the force applied to the handle in the third direction.

15. A vehicle, comprising:
an input device including a handle movable in a first direction and a second direction, a motor configured to generate force related to a movement of the handle, a driver configured to operate the motor, and an input device controller configured to operate the driver to limit a moving direction of the handle to the first direction or the second direction based on a control item controlled by the movement of the handle;
a vehicle controller configured to transmit information regarding the control item to the input device; and
a display configured to display a plurality of graphical user interfaces respectively corresponding to a plurality of sub-control items for the control item.

16. The vehicle according to claim 15, wherein the input device controller is configured to match and store a haptic pattern for each control item, and to operate the driver to output a haptic feedback to the handle according to the haptic pattern matched to the input control item in response to receiving information regarding the control item from the vehicle controller.

17. The vehicle according to claim 16, wherein the haptic pattern is defined by at least one of the moving direction of the handle, the number of the control items in graphical user interfaces displayed on a display, and an intensity of the haptic feedback.

18. The vehicle according to claim 17, wherein the input device controller is configured to operate the driver to generate a force applied in a direction opposite to a direction in which the handle moves by the user to output the haptic feedback to the handle.

19. The vehicle according to claim 18, wherein the graphical user interface displayed on the display includes a first graphical user interface and a second graphical user interface displayed adjacent to each other.

20. The vehicle according to claim 19, wherein, in response to the handle being moved from a position corresponding to the first graphical user interface to a position corresponding to the second graphical user interface, the input device controller is configured to operate the driver to increase a magnitude of the force applied in the direction opposite to the direction in which the handle moves.

21. The vehicle according to claim 20, wherein, in response to the handle being moved to a position corresponding to the second graphical user interface, the input device controller is configured to operate the driver to decrease the magnitude of the force applied in the opposite direction of the moving direction.

22. The vehicle according to claim 18, wherein the display is configured to highlight and display a graphic user interface corresponding to the position of the handle.

23. A method of controlling an input device, the input device including a handle movable in a first direction and a second direction, a motor configured to generate force related to a movement of the handle, and a driver configured to operate the motor, the method comprising:
detecting, by a first detector, a touch on the handle using a sensor;
activating, by the controller, the input device in response to detecting the touch on the handle
receiving, by a controller, a control item among a plurality of control items selected by the user, a plurality of control items being controlled by a vehicle;
in response to determining that the control item matches the movement in the first direction, limiting, by the controller, the movement of the handle to the first direction;
in response to determining that the control item matches the movement in the second direction, limiting, by the controller, the movement of the handle to the second direction;
receiving, by the handle, a selection of one of a plurality of sub-control items for the control item;
transmitting, by the controller, a signal related to the selection of one of a plurality of sub-control items, based on the movement of the handle along the first direction or the second direction.

24. The method according to claim 23, further comprising:
operating, by the controller, the driver to output a haptic feedback to the handle according to a haptic pattern matched to the received control item.

25. The method according to claim 24, wherein the operating of the driver includes:
operating, by the controller, the driver to generate a force applied in a direction opposite to a direction in which the handle moves by the user to output the haptic feedback to the handle.

26. The method according to claim 25, wherein the operating of the driver includes:
adjusting, by the controller, a magnitude of the force applied in the opposite direction to the direction in which the handle moves according to the position of the handle.

27. The method according to claim 23, further comprising:
detecting, by a second detector, a force applied in a third direction perpendicular to the first direction and the second direction; and
generating, by a vibration generator, a vibration in the handle in response to detecting the force applied in the third direction.

28. An input device, comprising:
a handle configured to be movable in a first direction and a second direction;
a motor configured to generate force related to a movement of the handle;
a driver configured to operate the motor; and
a controller configured to receive information regarding a control item among a plurality of control items controlled by a vehicle and to operate the driver to limit a moving direction of the handle to the first direction or the second direction based on the received information,
wherein the controller is configured to match and store a haptic pattern for each control item, and to operate the driver to output a haptic feedback to the handle according to the haptic pattern matched to the input control item in response to receiving information regarding the control item,
wherein the haptic pattern is defined by at least one of the moving direction of the handle, the number of the control items in graphical user interfaces displayed on a display, and an intensity of the haptic feedback,
wherein the controller is configured to operate the driver to generate a force applied in a direction opposite to a direction in which the handle moves by the user to output the haptic feedback to the handle,
wherein the graphical user interface displayed on the display includes a first graphical user interface and a second graphical user interface displayed adjacent to each other,
wherein, in response to the handle being moved from a position corresponding to the first graphical user interface to a position corresponding to the second graphical user interface, the controller is configured to operate the driver to increase a magnitude of the force applied in the direction opposite to the direction in which the handle moves.

29. The input device according to claim 28, wherein, in response to the handle being moved to a position corresponding to the second graphical user interface, the controller is configured to operate the driver to decrease the magnitude of the force applied in the opposite direction of the moving direction.

30. An input device, comprising:
a handle configured to be movable in a first direction and a second direction;
a motor configured to generate force related to a movement of the handle;
a driver configured to operate the motor;
a second detector configured to detect a force applied to the handle in a third direction;
a vibration generator configured to generate vibration and provide the vibration to the handle; and
a controller configured to receive information regarding a control item among a plurality of control items controlled by a vehicle and to operate the driver to limit a moving direction of the handle to the first direction or the second direction based on the received information;
wherein the handle is configured to receive a selection of one of a plurality of sub-control items for the control item regarding the received information,
wherein the controller is configured to transmit a signal related to the selection of one of a plurality of sub-control items, based on the movement of the handle along the first direction or the second direction.

31. The input device according to claim 30, wherein the controller is configured to operate the vibration generator to generate the vibration in response to detecting the force applied to the handle in the third direction.

* * * * *